United States Patent
Bishay et al.

(10) Patent No.: US 6,507,364 B1
(45) Date of Patent: Jan. 14, 2003

(54) EDGE-DEPENDENT INTERPOLATION METHOD FOR COLOR RECONSTRUCTION IN IMAGE PROCESSING DEVICES

(75) Inventors: Magued M. Bishay, Newport Beach, CA (US); Randy M. Chung, Laguna Niguel, CA (US)

(73) Assignee: Pictos Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/042,142

(22) Filed: Mar. 13, 1998

(51) Int. Cl.[7] .............................. H04N 3/14; H04N 9/64
(52) U.S. Cl. ....................... 348/242; 348/250; 348/253; 348/273; 358/521; 382/167
(58) Field of Search .................................. 382/162, 167, 382/199, 266, 267, 300, 275; 358/500, 518, 521, 525, 428, 443, 447; 348/266, 272, 273, 277, 279, 280, 222, 252, 253, 607, 625, 630, 220.1–224.1

(56) References Cited

U.S. PATENT DOCUMENTS

| 4,630,307 A | * | 12/1986 | Cok | 382/165 |
| 5,373,322 A | | 12/1994 | Laroche et al. | 348/273 |
| 5,402,171 A | * | 3/1995 | Tagami | 348/279 |
| 5,602,654 A | * | 2/1997 | Patti | 358/461 |
| 5,652,621 A | | 7/1997 | Adams, Jr. et al. | 348/272 |
| 5,778,106 A | * | 7/1998 | Juenger | 382/275 |
| 5,790,269 A | * | 8/1998 | Masaki | 382/199 |
| 5,821,999 A | * | 10/1998 | Barnsley | 348/272 |
| 6,229,578 B1 | * | 5/2001 | Acharya | 348/607 |
| 6,262,773 B1 | * | 7/2001 | Westerman | 348/448 |

* cited by examiner

*Primary Examiner*—Ngoc-Yen Vu
(74) *Attorney, Agent, or Firm*—Christopher J. Rourk; Akin, Gump, Strauss, Hauer & Feld, LLP (57) ABSTRACT

An image processing device is provided for still and video imaging systems which use a low number of samples per image pixel, preferably a single color component per each image pixel. The device includes an edge-dependent and edge-side-dependent color interpolation process, preferably implemented within the imaging system or within a host image processing computer hardware. The process reconstructs the missing color components of each said image pixel with high accuracy, because it is based on the detection of the spatial features present in the pixel neighborhood, thus providing sharp images without artifacts and with smooth transition in hue from pixel to pixel.

22 Claims, 3 Drawing Sheets

EDGE-DEPENDENT INTERPOLATION METHOD FOR COLOR RECONSTRUCTION IN IMAGE PROCESSING DEVICES

BACKGROUND OF THE INVENTION

1. Field of the Invention

The present invention relates generally to image processing, and more specifically pertains to devices using an interpolation method for improvement of images obtained with imaging systems having a low number of samples per image pixel.

2. Description of Related Art

In a photographic imaging system three components of color information have to be captured simultaneously. To create an analogous digital imaging system which simultaneously captures all three components of color information would require three separate imaging detectors, which would be prohibitive in cost and packaging complexity. To keep the size of a digital video imaging system and its cost to a minimum, the number of sampled image data, transferred from the imaging system to an image processing device, has to be kept low. Moreover, lately, the electronic still and video imaging systems have been using silicon chips for image sensor arrays, and since the size of the chip should be kept small, these imaging systems have to transfer a low number of samples per image pixel. Therefore, the electronic imaging systems typically use a single detector, usually covered with a filter mosaic called a color filter array (CFA), and acquire a scene image by sampling in three color components to obtain an array which stores only one color component per pixel. These imaging systems use a low number of samples per image pixel because they ignore the other two color components for each pixel.

Since each filter of the color filter array covers a single pixel and passes only a color in a specific spectral band, before the image gets to be processed further and displayed, the scene color has to be reconstructed so that each pixel has all three color components. Therefore, the two missing color components for each pixel have to be estimated by a color reconstruction technique. Conventional color reconstruction methods use conventional interpolation techniques to include replication of the values of nearest neighbors, while others use linear or logarithmic interpolation averaging techniques, usually interpolating an average intensity value of the neighboring pixels of the missing color. For example, in the RGB system where there are red, green and blue pixels, for each green pixel the missing red and blue color components have to be reconstructed by the interpolation method, using, for example, the adjacent pixels with the same-color components.

The interpolation problem is quite complex and when selecting the interpolation technique the nature and size of the interpolation error should be considered. Moreover, real time applications require an interpolation algorithm with minimum computational complexity. Further, the method for reconstruction of the missing color components should provide high quality images which are sharp and without color artifacts.

The color artifacts usually occur around edges of an image due to high spatial frequency. Localized spatial features, such as image edges and areas where hues of adjacent pixels change abruptly, can cause color and luminance estimates obtained with the conventional interpolation methods to be quite inaccurate, which may lead to significant pixel artifacts in the final image. Further, in imaging systems with low number of samples per image pixel, color artifacts occur when one of the color components is missing the necessary pixel required to reconstruct the edge by the interpolation method.

The conventional interpolation algorithms do not provide sharp enough images without color artifacts and appear to be inadequate. Moreover, the interpolation errors, which result from use of the conventional interpolation algorithms, are propagated through the rest of the imaging chain. A sharpening filter is usually applied to improve the image quality before displaying the image. However, in the conventional algorithms, the color artifacts are not corrected with a sharpening filter, but are typically further boosted when a sharpening filter is applied.

Therefore, there is a need for an interpolation algorithm for digital imaging systems which use a low number of samples per image pixel, which can provide the missing color components with high accuracy, and provide sharp images without color artifacts.

OBJECTS AND SUMMARY OF THE INVENTION

It is a primary object of the present invention to overcome the aforementioned shortcomings associated with the prior art and provide an image processing device which uses a low number of samples per pixel, preferably only one color component for each pixel, and is capable of generating sharp, artifact-free color images.

Another object of the present invention is to provide a reconstruction method which uses an interpolation algorithm capable of providing high quality images, which are sharp and without color artifacts around edges.

Yet another object of the present invention is to provide an interpolation method with minimum computational complexity which can be implemented in a computer program, and preferably embedded in computer hardware.

These as well as additional objects and advantages of the present invention are achieved by providing an image processing device which receives from an imaging system an image having a pixel pattern which has a half-pixel offset in a horizontal direction in every second row, in order to provide a more uniform sampling of the image for each color component.

The interpolation method of the present invention determines the missing color components at each pixel from the neighboring pixels. The missing color components are obtained as the hue-weighted intensity values of neighboring pixels of the same color. The choice of which neighboring pixels to use is based on the values of four edge detection kernels applied to the current pixel, and on the intensity value of the current pixel. The four edge kernels are sensitive to horizontal, vertical, +30 degrees and −30 degrees edges, in arrays with half-pixel offset. The choice of these neighboring pixels is based on the edge direction and the side of the edge the current pixels belong to in the image.

After reconstruction of the missing color components at each pixel, a reconstructed array of color pixels is obtained. This array preferably has every second row offset from its neighboring rows by a half-pixel. To correct this offset prior to image display or printing, every second row is interpolated horizontally or vertically. Because the horizontal interpolation may result in a saw-tooth effect at vertical edges, this effect is corrected by vertical interpolation at vertical edges.

The method of the present invention uses an algorithm which is computationally simple and amenable to hardware implementation by embedding, since it requires simple integer arithmetic and binary shifts for addition, subtraction, multiplication and division by one of the two integers, 3 or 5. Since all divisions are performed by dividing integer values with 3 or 5, the divisions can be avoided by using predetermined division results implemented in a look-up table.

BRIEF DESCRIPTION OF THE DRAWINGS

The objects and features of the present invention are set forth with particularity in the appended claims. The present invention, both as to its organization and manner of operation, together with further objects and advantages, may best be understood by reference to the following description, taken in connection with the accompanying drawings, wherein:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide a device for image processing which uses an edge-dependent color interpolation method for reconstructing the missing color components of image pixels.

Figure 1:
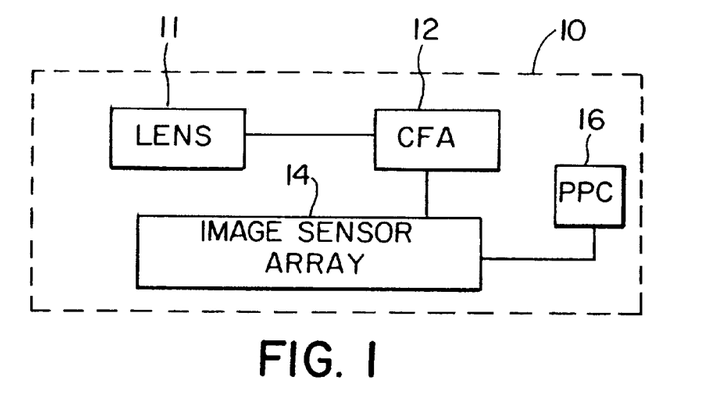
FIG. 1 is a block diagram illustration of an imaging system that represents the present invention.
Figure 2:
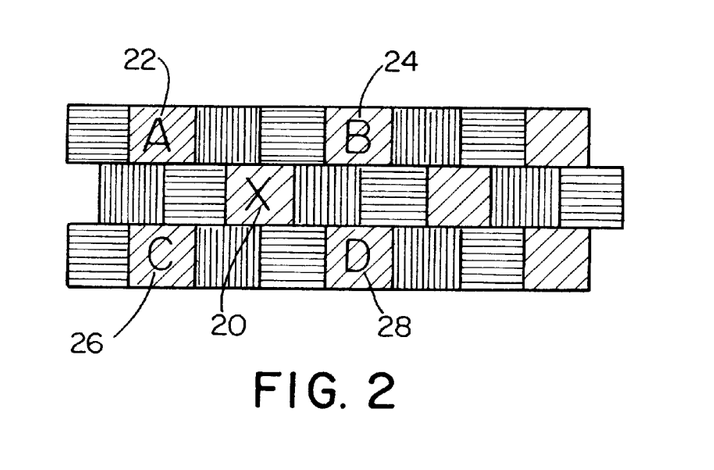
FIG. 2 is a schematic illustration of a pixel color pattern layout from the imaging system of FIG. 1 using a half-pixel offset image sensor array, in accordance with a preferred embodiment of the present invention.

FIG. 2 is a schematic illustration of a pixel color pattern layout of an image sensor array which is preferably a half-pixel offset image sensor array 14 of an imaging system 10 of FIG. 1. The half-pixel offset image sensor array 14 is a detector, preferably a CMOS detector, that can be read out digitally. It is contained in the electronic digital video imaging system 10 having a lens 11. The detector is covered with a color filter array 12 which acquires scene images by sampling an input scene in three color components. The half-pixel offset image sensor array 14 saves only one color component per pixel, because each filter of the color filter array 12 is of one color and covers a single pixel of the image sensor array 14.

Figure 8:
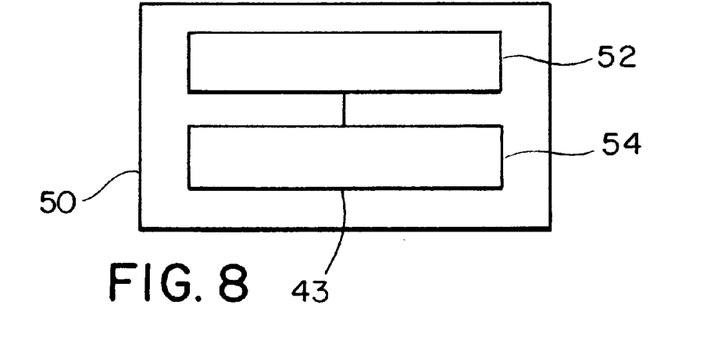
FIG. 8 a block diagram illustration of a host processor used by the method of the present invention.

The imaging system 10 may have a pixel processing controller chip 16, preferably fabricated as an ASIC chip, in which case the contents of the half-pixel offset image sensor array 14 may be partially processed on the chip 16 and then sent to an associated host 50 (FIG. 8) whose image processor 52, is attached to the imaging system 10 via a bus, not shown. If there is no chip 16 in the imaging system 10 itself, the host image processor 52 may be used for all pixel processing.

The imaging systems 10 of the present invention uses the RGB system of FIG. 2, where the pixel whose color red intensity value is saved is called a red pixel, the pixel whose color blue intensity value is saved is called a blue pixel, and the pixel whose color green intensity value is saved is called a green pixel. However, the method and device of the present invention may be similarly implemented in any color system in which three different color components exist in three horizontally neighboring pixels, and no two pixels of the same color are neighbors. In the RGB system, all lines of the color filter array 12 and thus the half-pixel offset image sensor array 14 keep the same order of pixel colors. For example, in the RGB system of FIG. 2, a green pixel is always followed by a blue pixel which is always followed by a red pixel, which is always followed by another green pixel. Moreover, in this system each even image sensor array 14 line starts with the same color, which is different from the starting color of the odd lines. In the example of FIG. 2, the lines 0 and 2 start with a red pixel, which is followed by a green and a blue pixel. The line 1 starts with a blue pixel followed by a red and a green pixel.

In the present invention, as shown in FIGS. 1 and 2, the color filter array 12 of the imaging system 10 has a pattern that matches the half-pixel offset image sensor array 14. However, the present invention may be used with different pattern layouts. The digital imaging system 10 of the present invention uses the half-pixel offset image sensor array 14 in order to obtain high resolution images with a low number of samples per each pixel system and generate sharp, artifact-free color images, while keeping the cost to a minimum.

The reconstruction of the missing color components is accomplished in the method embodiment of the present invention by estimating the missing color information for each pixel. The method detects and analyzes local spatial features of the pixels present in each pixel's neighborhood. It then determines and reconstructs the missing color components of each pixel in the image sensor array 14, from neighboring pixels that have the missing colors. For instance, in the RGB system, for a blue pixel the missing red and green components are obtained as the hue-weighted values of neighboring red and green pixels, respectively. In another embodiment of the present invention the interpolation method of the present invention is implemented within an actual imaging system.

The interpolation algorithm of the present invention chooses certain neighboring pixels to provide the missing color components. The choice of these neighboring pixels is based on the edge direction and the side of the edge the current pixels belong to in the image. Therefore, the method aspect of the present invention performs edge direction detection at each pixel. During the color reconstruction step, and before the image is displayed, each pixel acquires the correct spatial frequency for each of its color components. If this constraint is violated, color artifacts will appear.

In the edge detection technique of the present invention, the choice of which neighboring pixels to use for the estimate of the missing color components, as applied to a current pixel X 20 shown in FIG. 2, is made based on the values of, preferably four, edge detection kernel pixels A 22, B 24, C 26, and D 28 surrounding the current pixel X 20, and on the color intensity value of the current pixel X 20. In order to perform edge detection for the pixel X 20, four edge detection kernel pixels A 22, B 24, C 26, and D 28 each of the same color as the pixel X 20 are chosen to be in the immediate proximity of the pixel X 20.

Figure 3:
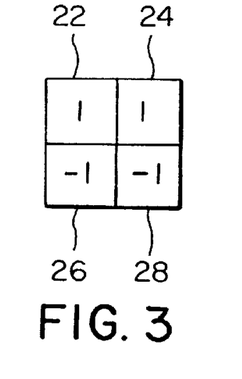
FIGS. 3–6 are schematic illustrations of four edge detection kernels, using kernel pixels A, B, C, and D, in accordance with a preferred embodiment of the present invention.
Figure 4:
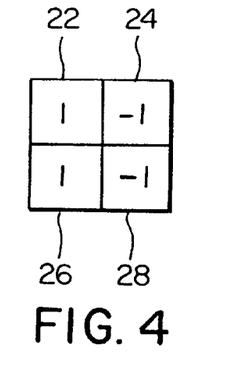
Figure 5:
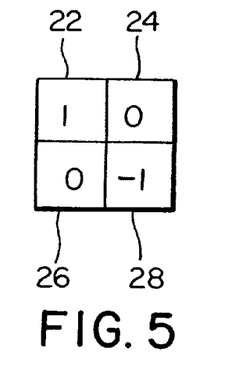
Figure 6:
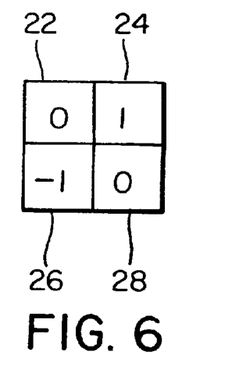

The exemplary method of the present invention is described in relation to FIGS. 1–11. To reconstruct the missing color components at the current pixel X 20 (FIG. 2), which is green, the edge detection kernels have to be defined. In the preferred embodiment of the present invention the edge detection kernel pixels preferably form four different combination kernels, shown in FIGS. 3–6, where FIG. 3 represents a horizontal edge detection kernel. FIG. 4 represents a vertical edge detection kernel. FIG. 5 represents a 45-degree edge detection kernel and FIG. 6 represents a negative 45-degree edge detection kernel.

In the preferred, half-pixel offset image sensor array 14 the four kernels are sensitive to the possible direction of an edge in the image frame close to the pixel X 20, namely in the horizontal direction, vertical direction, +30 degrees direction, along line BXC, and −30 degrees direction, along line AXD. It should be understood that the preferred embodiments of the present invention may work with different number and composition of edge detection kernels, depending on the system used for the imaging system pattern layout. If the image sensor array 14 does not have a half-pixel offset, instead of +30 degrees the edge along the BXC line is at +45 degrees, and instead of −30 degrees the edge along AXD line is at −45 degrees.

As shown in FIGS. 3–6, the horizontal edge detection kernel in the RGB system has a positive sign for A kernel pixel 22 and B kernel pixel 24 and a negative sign for C kernel pixel 26 and D kernel pixel 28. The vertical edge detection kernel has a positive sign for A kernel pixel 22 and C kernel pixel 26 and a negative sign for B kernel pixel 24 and D 28 kernel pixel 28. The 45-degree edge detection kernel has only A kernel pixel 22 and D kernel pixels 28, with a positive sign for A kernel pixel 22 and a negative sign for D kernel pixel 28. The negative 45-degree edge detection kernel has only B kernel pixel 24 and C kernel pixel 26, with a positive sign for B kernel pixel 24 and a negative sign for C kernel pixel 26.

Figure 7:
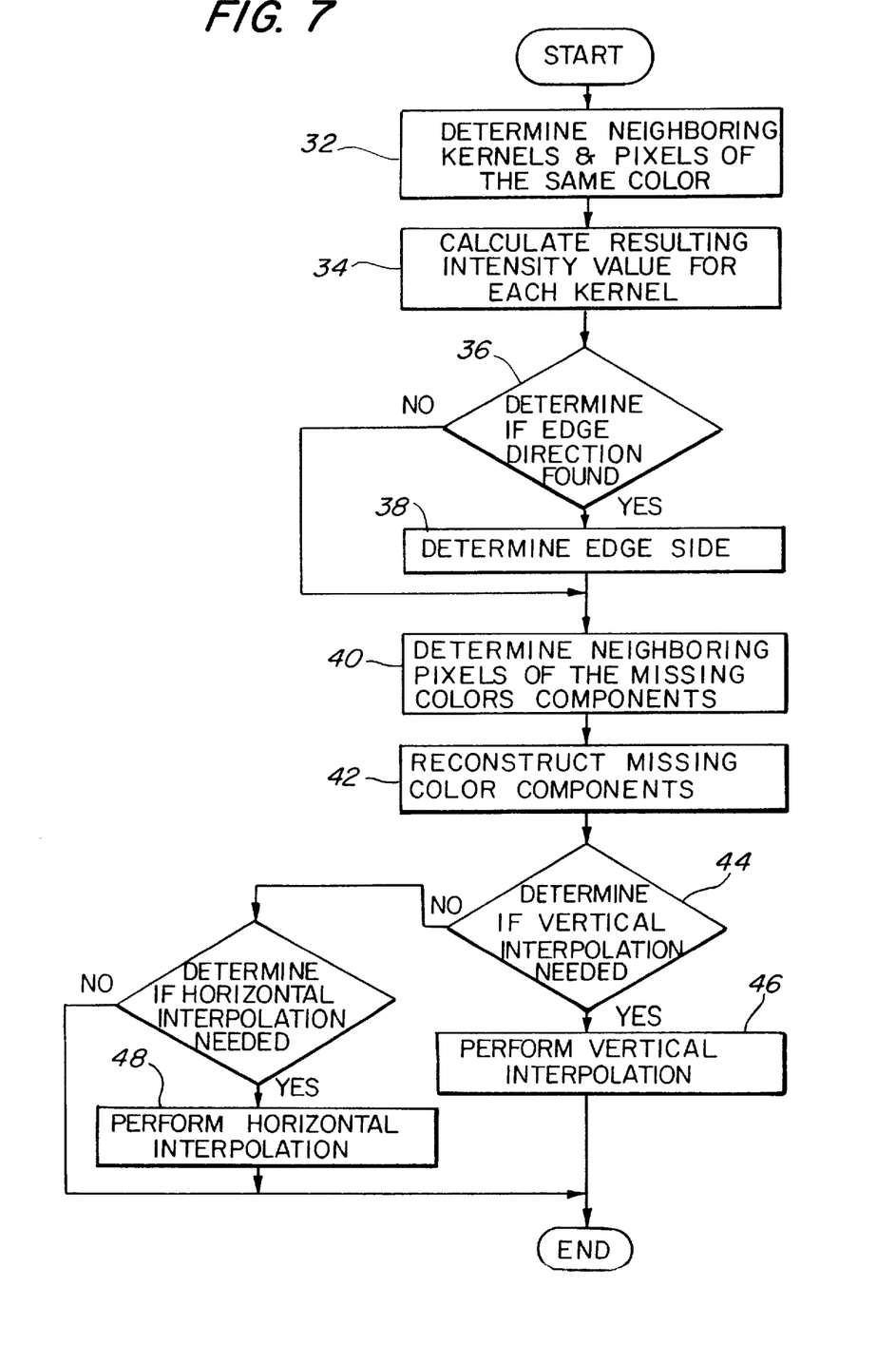
FIG. 7 illustrates a flowchart presenting the steps of the interpolation method of the present invention performed for each pixel.

FIG. 7 illustrates a flowchart presenting the steps of the method of the present invention performed for each current pixel X 20. At each current pixel X 20 of the image frame, the four same-color neighboring edge detection kernel pixels A 22, B 24, C 26, and D 28 are determined in step 32 of FIG. 7. For each current pixel X 20, resulting intensity values for each kernel are calculated in step 34, by adding or subtracting intensity values of the four corresponding edge detection kernel pixels A 22, B 24, C 26, and D 28, according to their sign. For example, the horizontal edge detection kernel for the pixel X 20 has the resulting intensity value equal to the sum of A kernel pixel 22, B kernel pixel 24, C kernel pixel 26 multiplied by (−1), and D kernel pixel 28 multiplied by (−1).

In step 36, the resulting intensity values, obtained for each kernel, are compared to find the maximum resulting intensity value. If the resulting maximum value is higher than a threshold T, it represents the edge direction, i.e., horizontal, vertical, 45 degrees or −45 degrees. In the preferred embodiment of the present invention using the half-pixel offset image sensor array 14 the edge direction may be horizontal, vertical, +30 degrees or −30 degrees in direction. If the resulting maximum intensity value for all the kernels is lower than the threshold T, it is assumed that there is no edge close to the current pixel X 20.

If an edge direction has been found in the step 36 for the current pixel X 20, the side of the edge the current pixel X 20 belongs to has to be determined in step 38, by comparing the color intensity of the current pixel X 20, green in the example of FIGS. 1–11, with the average value of the color intensity of the pixels of the same color, located next to the current pixel X 20, which in our example is one or two pixels at each side of the determined edge. For example, in order to find which side of the edge the current pixel X 20 belongs to, after it has been determined that the highest resulting intensity value for this pixel lies in the horizontal direction (FIG. 3), the intensity value of the current pixel X 20 is compared to a top line average value, which is an average of intensity values of A 22 and B 24 kernel pixels, and a bottom line average value, which is an average of intensity values of C 26 and D 28 kernel pixels of the horizontal kernel.

If the current pixel X 20 does not belong to either side of the edge, according to a threshold T", that means that the pixel X 20 is on the edge itself and that the edge has the thickness of one pixel. In this case, the missing red and blue components come from the pixels from the same line as the current pixel X 20, if the edge is horizontal, or from the line closest to the edge with the current pixel X 20, which is parallel with the edge, for the vertical, 30 degree and −30 degree edges.

The missing color components of the current pixel X 20, red and blue, are then reconstructed by retrieving in step 40 one red and one blue neighboring pixel from the same side of the edge the current pixel X 20 belongs to. The reconstruction of the missing red and blue component in step 42, using the retrieved red and blue components, proceeds according to the following equations for determining estimated intensity values Red(x) and Blue(x) for the missing color components of the current pixel X 20, to accomplish pattern matching at the. edges, where Red(n) and Blue(n) represent an average of the intensity values of the neighboring pixels of the same color:

$$Red(x)=Red(n)*Green(x)/Green_{ave}$$

$$Blue(x)=Blue(n)*Green(x)/Green_{ave}$$

For example, if it is determined that the current pixel X 20 is closer to the top side, because its intensity value is closer to the top average value of A 22 and B 24 kernel pixels, then a red pixel and a blue pixel from the line above the current pixel X 20, which are neighboring the current pixel X 20, are used in the step 40 as the red and blue neighbors. The $Green_{ave}$ is then determined as the average intensity of the three pixels from the determined side, the current pixel X 20, and its A 22 and B 24 kernel pixels. If the intensity value of the current pixel X 20 is closer to the bottom side of the edge, then a red pixel and a blue pixel from the line below the current pixel X 20, which are neighboring the current pixel X 20, are used in the step 40 as the red and blue neighbors, and the $Green_{ave}$ is determined as the average intensity of the pixel X 20 and its C 26 and D 28 kernel pixels. A similar procedure is used if it is determined that the current image pixel X 20 belongs to an edge which has a vertical, +30 degrees or −30 degrees direction.

In the absence of an edge, a modified method of estimation has to be used for the missing color components of the current pixel X 20. For this purpose, the same, previously defined, equations are used to determine the estimated intensity values Red(x) and Blue(x) for the missing colors of the current pixel X 20, but the Red(n) and the Blue(n) values are determined as the average of all the red and blue pixels, respectively, surrounding the current pixel X 20, which is three pixels of each color in our example. The average value of the current pixel 20 color intensity, $Green_{ave}$, in this example may be determined as (A+B+C+D+X)/5, (A+X+C)/3, or the average of any three intensity values of the five pixels: A 22, B 24, C 26, D 28, and X 20.

Figure 9:
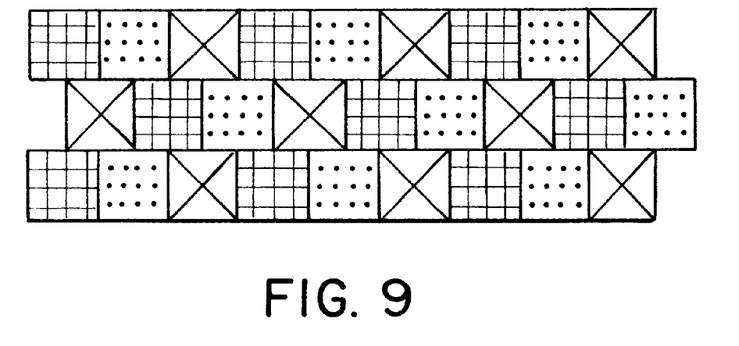
FIG. 9 is a schematic illustration of a pixel color pattern layout of a reconstructed array with a half-pixel offset, generated by the method of the present invention.

As a result of the reconstruction of the missing color components at each pixel of the half-pixel offset image sensor array 14 of the present invention, a reconstructed array 43 of FIG. 9 is obtained, where the odd rows are also offset from the even rows by a half-pixel, because it follows the offset of the image sensor array 14. However, if another pattern layout was used in the input image sensor array 14, the reconstructed array 43 may have different offset or no offset at all. To correct the half-pixel offset in the reconstructed array 43, its odd rows or even rows are interpolated according to either a horizontal interpolation step 48 or a vertical interpolation step 46 of FIG. 7.

Figure 10:
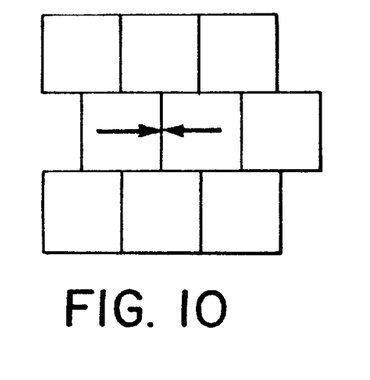
FIG. 10 is a schematic illustration of the horizontal interpolation method, in accordance with a preferred embodiment of the present invention.

In the horizontal interpolation technique of the present invention, on each odd or even line, but not on both, a new pixel is created instead of the current pixel, which is offset by a half-pixel from the current pixel. This is created by applying one of the following two steps on every pixel of every odd or even line of the reconstructed array 43 to obtain the average intensity value for each new pixel. First, for each current pixel, the intensity values of each of its two horizontally neighboring pixels of the same color are compared in step 44. If the difference is lower than a threshold T'', the horizontal interpolation step 48 is performed where each color component of the new pixel is obtained by averaging the respective color component of the two horizontally neighboring pixels, one on each side of the current pixel, as shown in FIG. 10.

Figure 11:
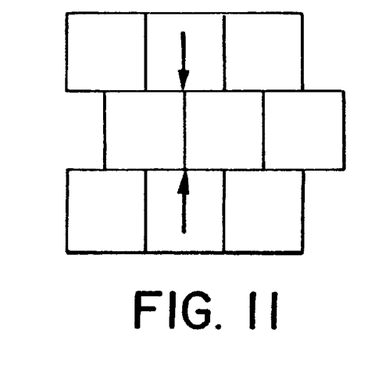
FIG. 11 is a schematic illustration of the vertical interpolation method, in accordance with a preferred embodiment of the present invention.

However, the horizontal interpolation, in some cases, may result in a saw-tooth effect at vertical edges of the reconstructed array 43. This effect is corrected in the present invention by performing a vertical interpolation step 46 at vertical edges of the reconstructed array 43, as shown in FIG. 11, instead of performing the horizontal interpolation of FIG. 10. When, for each current pixel X 20, the intensity values of each of its two horizontally neighboring pixels of the same color are compared, and the difference is found to be higher than a threshold T''', each color component of the new pixel is obtained by averaging the respective color components of its vertically neighboring pixels, above and below the current pixel X 20, as shown in FIG. 11.

The reconstruction method of the present invention is computationally simple and amenable to hardware implementation, since it only requires simple integer arithmetic in the equations which have addition, subtraction, multiplication and division by one of two integers, numbers 3 or 5. Since all divisions involve dividing integer values with the number 3 or 5, instead of performing the actual division, the division result can be pre-calculated, and implemented in a look-up table, not shown, which is preferably a 255-location look-up table.

The principles of the interpolation method of the present invention may be implemented in a computer program stored in the imaging device 10 pixel processing controller chip 16 or in the host image processor 52, and is amenable to be embedded within the hardware. If the interpolation method is performed in the imaging device 10 itself, a part of the pixel processing and control may be performed before the bus transfer to the host and another part in the host. If the interpolation method is performed in the host image processor 52, its computer storage area 54 stores the received contents of the input image sensor array 14, and uses them by the interpolation method of the present invention to create the reconstructed array 43.

The results of experimentation using the preferred embodiments of the present invention have proven that the new algorithm produces sharper images with much less artifacts, because the method is edge-dependent and edge-sided-dependent. Moreover, the method of the present invention is sensitive to the chosen threshold values T, T', T'', and T'''. which must be determined empirically and may be optimized according to the pixel neighborhood.

The preferred embodiments of the present invention, although applicable to any digital imaging system, are believed to be especially applicable to the still and video imaging systems which use silicone chips for the half-pixel offset image sensor arrays. The imaging system may be any type of digital imaging system that can be digitized, such as an imaging system using a CMOS or CCD detector. It is understood that the principles of this invention may be applied to other digital imaging systems which use low number of samples per pixel/image and must perform interpolation before the image is further processed and displayed, like office automation digital linear sensors, desktop video conferencing systems, digital scanners, copy machines, and fax machines.

Those skilled in the art will appreciate that various adaptations and modifications of the just-described preferred embodiment can be configured without departing from the scope and spirit of the invention. For instance, while the present invention has been described for green current pixels, it is understood that the appropriately modified equations of the present invention are used to handle blue and red pixels. Furthermore, although shown in RGB system, the present invention is equally applicable in the systems with different pixel layout, where red, green and blue color sequences may be substituted with other color sequences used in electronic photography in which three different color components exist in three horizontally neighboring pixels, and no two pixels of the same color are neighbors. Therefore, it is to be understood that, within the scope of the appended claims, the invention may be practiced other than as specifically described herein.

What is claimed is:

1. An image processor for reconstructing the missing color components for image pixels of an image from an associated image sensor array with three color components, each image pixel having a single color component pixel intensity value, said image processor comprising:

means for determining for each image pixel a plurality of edge detection kernels having the same color as the image pixel, wherein each edge detection kernel comprises a plurality of edge detection kernel pixels neighboring said image pixel; and means for reconstructing the missing color components of each image pixel having:

edge direction detection means for detecting direction of edges of the image and a side of the edge the image pixel belongs to, according to a highest valid resulting intensity value of said edge detection kernels, and color reconstruction means for determining, for each image pixel, an intensity value of each said missing color component and for saving all color components for each image pixel in a reconstructed array, if the edge is found, said edge direction detection means determining the side of the edge the image pixel belongs to by comparing an intensity value of the image pixel with an average intensity value of the neighboring same-color pixels at each side of the determined edge, and said color reconstruction means determining the intensity value of each said missing color component as a hue-weighted intensity value of the neighboring image pixels of the same missing color, on the same side of the detected image edge, or, if the image pixel is on the edge, of the neighboring image pixels of the same missing color from the edge or a line parallel with and closest to the edge, and in the absence of an edge, said color reconstruction means determining the intensity value of each said missing color component as a hue-weighted average intensity value of the surrounding image pixels of the same missing color, said hue-weighing comprising multiplication with the image pixel intensity value and division with an average intensity value of the image pixel and a plurality of neighboring image pixels of the same color.

2. The processor according to claim 1, wherein said edge direction detection means comparing the resulting intensity values obtained for each said edge detection kernel, wherein each said resulting intensity value is a total of the intensity values of all said edge detection kernel pixels of said kernel, and finding a maximum resulting intensity value higher than a predetermined threshold.

3. The processor according to claim 1, wherein said edge direction detection means and color reconstruction means are included in a computer program embeddable within the image processor hardware.

4. The processor according to claim 1, wherein:

said image sensor array being covered with a color filter array;

said image sensor array and said color filter array having a half-pixel offset pixel pattern, wherein each image pixel in every second row is offset by a half-pixel in horizontal direction from image pixels in neighboring rows, in order to get a high resolution image; and a 45 degree kernel and a −45 degree kernel are sensitive to +30 degrees and −30 degrees edges, respectively.

5. The processor according to claim 4, wherein said reconstructed array also having a half-pixel offset, and wherein said processor further comprises a horizontal interpolation means and a vertical interpolation means.

6. The processor according to claim 5, wherein said processor comparing the intensity values of the same-color component of the horizontally neighboring pixels of the image pixel and, if the difference is higher than a threshold, using the vertical interpolation means to obtain intensity values of all color components for said image pixel by averaging intensity values of the corresponding color component of the vertically neighboring pixels.

7. The processor according to claim 5, wherein said processor comparing the intensity values of the same-color component of two horizontally neighboring pixels of the image pixel and, if the difference is lower than a threshold, using the horizontal interpolation means to obtain intensity values of all color components for said image pixel by averaging intensity values of the corresponding color component of the two horizontally neighboring pixels.

8. An image processor for reconstructing the missing color components for image pixels of an image from an associated image sensor array with three color components, each image pixel having a single color component pixel intensity value, said image processor comprising:

means for determining for each image pixel a plurality of edge detection kernels having the same color as the image pixel, wherein each edge detection kernel comprises a plurality of edge detection kernel pixels neighboring said image pixel; and means for reconstructing the missing color components of each image pixel having:

edge direction detection means for detecting direction of edges of the image and a side of the edge the image pixel belongs to, according to a highest valid resulting intensity value of said edge detection kernels, and color reconstruction means for determining, for each image pixel, an intensity value of each said missing color component and for saving all color components for each image pixel in a reconstructed array, said plurality of edge detection kernels comprising four edge detection kernels, namely a horizontal, a vertical, a 45 degree and a −45 degree kernel, said kernels sensitive to horizontal, vertical, +45 degrees and −45 degrees edges, respectively, each said edge detection kernel comprising four edge detection kernel pixels encircling and neighboring said image pixel, namely a top-left, a top-right, a bottom-left and a bottom-right kernel pixel of said image, and wherein, in order to calculate the resulting intensity value as a total of the intensity values of all said edge detection kernel pixels of said kernel, said horizontal kernel multiplying said bottom-left and bottom-right kernel pixel intensity values with −1, said vertical kernel multiplying said top-right and bottom-right kernel pixel intensity values with −1, said 45 degree kernel multiplying said top-right and bottom-left kernel pixel intensity values with zero and said bottom-right pixel intensity value with −1, and said −45 degree kernel multiplying said top-left and bottom-right kernel pixel intensity values with zero and said bottom-left pixel intensity value with −1.

9. An edge-dependent color interpolation method for reconstructing the missing color component for each pixel of an image received from an associated image sensor array, each image pixel having a single color component, said method comprising the steps of:

determining for each image pixel a plurality of edge detection kernels having the same color as the image pixel, each edge detection kernel comprising a plurality of edge detection kernel pixels neighboring said image pixel; and reconstructing the missing color components of each image pixel, according to the steps:

detecting direction of edges of the image and a side of the edge the image pixel belongs to, according to a highest valid resulting intensity value of said edge detection kernel, and determining for each image pixel an intensity value of each said missing color component and saving all color components for each image pixel in a reconstructed array;

if the edge is found, said edge direction detection step determining the side of the edge the image pixel belongs to by comparing an intensity value of the image pixel with average intensity values of the neighboring same-color pixels at each side of the determined edge, and said color reconstruction step determining the intensity value of each said missing color component as a hue-weighted intensity value of the neighboring image pixels of the same missing color, on the same side of the detected image edge, or, if the image pixel is on the edge, of the neighboring image pixels of the same missing color from the edge or a line parallel with and closest to the edge, and in the absence of an edge, said color reconstruction step determining the intensity value of each said missing color component as a hue-weighted average intensity value of the surrounding image pixels of the same missing color, said hue-weighing comprising the step of multiplying with the image pixel intensity value and dividing with an average intensity value of the image pixel and a plurality of neighboring image pixels of the same color.

10. The method according to claim 9, wherein said edge direction detection step comparing the resulting intensity values obtained for each said edge detection kernel, wherein each said resulting intensity value is a total of the intensity values of all said edge detection kernel pixels of said kernel, and finding a maximum resulting intensity value higher than a predetermined threshold.

11. The method according to claim 9, wherein said method is executed by a computer program embeddable within an image processor hardware.

12. The method according to claim 9, wherein:

said image sensor array being covered with a color filter array;

said image sensor array and said color filter array having a half-pixel offset pixel pattern, wherein each image pixel in every second row is offset by a half-pixel in horizontal direction from image pixels in neighboring rows, in order to get a high resolution image; and a 45 degree kernel and a −45 degree kernel are sensitive to +30 degrees and −30 degrees edges, respectively.

13. The method according to claim 12, wherein said reconstructed array also having a half-pixel offset, and wherein said method is executed by a computer program, said computer program further having a horizontal interpolation step and a vertical interpolation step.

14. The method according to claim 13, wherein said computer program further comprising the following steps:

comparing the intensity values of the same-color component of the horizontally neighboring pixels of the image pixel, and if the difference is higher than a threshold, using the vertical interpolation step to obtain intensity values of all color components for said image pixel by averaging intensity values of the corresponding color component of the vertically neighboring pixels.

15. The method according to claim 13, wherein said computer program further comprising the following steps:

comparing the intensity values of the same-color component of the horizontally neighboring pixels of the image pixel, and if the difference is lower than a threshold, using the horizontal interpolation step to obtain intensity values of all color components for said image pixel by averaging intensity values of the corresponding color component of the horizontally neighboring pixels.

16. An edge-dependent color interpolation method for reconstructing the missing color component for each pixel of an image received from an associated image sensor array, each image pixel having a single color component, said method comprising the steps of:

determining for each image pixel a plurality of edge detection kernels having the same color as the image pixel, each edge detection kernel comprising a plurality of edge detection kernel pixels neighboring said image pixel; and reconstructing the missing color components of each image pixel, according to the steps:

detecting direction of edges of the image and a side of the edge the image pixel belongs to, according to a highest valid resulting intensity value of said edge detection kernel, and determining for each image pixel an intensity value of each said missing color component and saving all color components for each image pixel in a reconstructed array;

said plurality of edge detection kernels comprising four edge detection kernels, namely a horizontal, a vertical, a 45 degree and a −45 degree kernel, said kernels sensitive to horizontal, vertical, +45 degrees and −45 degrees edges, respectively, each said edge detection kernel comprising four edge detection kernel pixels encircling said image pixel, namely a top-left, a top-right, a bottom-left and a bottom-right kernel pixel of said image, and wherein, in order to calculate the resulting intensity value as the total of the intensity values of all said edge detection kernel pixels of said kernel, said horizontal kernel multiplying said bottom-left and bottom-right kernel pixel intensity values with −1, said vertical kernel multiplying said top-right and bottom-right kernel pixel intensity values with −1, said 45 degree kernel multiplying said top-right and bottom-left kernel pixel intensity values with zero and said bottom-right pixel intensity value with −1, and said −45 degree kernel multiplying said top-left and bottom-right kernel pixel intensity values with zero and said bottom-left pixel intensity value with −1.

17. An edge-dependent color reconstruction method implemented in an image processor receiving pixel intensity values for an image from an associated three-color image sensor array, each image pixel having a single color component, said method comprising the steps of:

determining for each image pixel a plurality of closest neighboring same-color pixels;

calculating resulting intensity values for each of a horizontal combination, vertical combination, right-to-left-down combination, and right-to-left-up combination of said neighboring same-color pixels;

determining if an edge exists by comparing the resulting intensity values to obtain a maximum resulting intensity value, and comparing the maximum resulting intensity value with a threshold value; and reconstructing and saving all color components for each image pixel in a reconstructed array, according to the steps:

if an edge exists:

determining the direction of an edge by determining the combination that has the maximum resulting intensity value, determining the side of the edge the image pixel belongs to by comparing the intensity value of the image pixel to an average color intensity value of the neighboring same-color pixels on each side of the edge, retrieving the neighboring pixels with the missing color components from the same edge side, and reconstructing the missing color components for the image pixel using the retrieved neighboring color components according to equation:

missing color component=(average intensity value of retrieved neighboring same-color pixel components)*(intensity of image pixel)/(average intensity of the same-color pixels from the determined side), and in the absence of an edge:
reconstructing the missing color components for the image pixel using the neighboring color components according to equation:

missing color component=(average intensity value of neighboring same-color pixel components)*(intensity of image pixel)/(average intensity of the image pixel and the neighboring same-color pixels).

18. The method according to claim 17, wherein said method is executed by a computer program embedded in the image processor chip, comprised within a digital camera with the image sensor array.

19. The method according to claim 17, wherein said method is executed by a computer program embedded in the image processor, comprised within a host computer accompanying a digital camera with the image sensor array.

20. The method according to claim 17, wherein:
said horizontal combination is a horizontal kernel, said vertical combination is a vertical kernel, said right-to-left-down combination is a 45 degree kernel, and said right-to-left-up combination is a −45 degree kernel, said edge detection kernels sensitive to horizontal, vertical, +45 degrees and −45 degrees edges, respectively, each said edge detection kernel comprising four edge detection kernel pixels encircling and neighboring said image pixel, namely a top-left, a top-right, a bottom-left and a bottom-right kernel pixel of said image, and wherein, in order to calculate the resulting intensity value as a total of the intensity values of all said edge detection kernel pixels of said kernel, said horizontal kernel multiplying said bottom-left and bottom-right kernel pixel intensity values with −1, said vertical kernel multiplying said top-right and bottom-right kernel pixel intensity values with −1, said 45 degree kernel multiplying said top-right and bottom-left kernel pixel intensity values with zero and said bottom-right pixel intensity value with −1, and said −45 degree kernel multiplying said top-left and bottom-right kernel pixel intensity values with zero and said bottom-left pixel intensity value with −1.

21. The method according to claim 20, wherein:
said image sensor array being covered with a color filter array;

said image sensor array and said color filter array having a half-pixel offset pixel pattern, wherein each image pixel in every second row is offset by a half-pixel in horizontal direction from image pixels in neighboring rows, in order to get a high resolution image;

a 45 degree kernel and a −45 degree kernel are sensitive to +30 degrees and −30 degrees edges, respectively;

said method is executed by a computer with a computer program; and said computer program further having a horizontal interpolation step and a vertical interpolation step, and being embeddable within the computer hardware.

22. The method according to claim 21, wherein said computer program further comprising the following steps:
comparing the intensity values of the same-color component of the horizontally neighboring pixels of the image pixel; and if the difference is higher than a threshold, using the vertical interpolation step to obtain intensity values of all color components for said image pixel by averaging intensity values of the corresponding color component of the vertically neighboring pixels, and if the difference is lower than a threshold, using the horizontal interpolation step to obtain intensity values of all color components for said image pixel by averaging intensity values of the corresponding color component of the horizontally neighboring pixels.

* * * * *